United States Patent [19]

Marshall

[11] Patent Number: 4,543,911
[45] Date of Patent: * Oct. 1, 1985

[54] MITTENS FOR CANINES

[75] Inventor: Tina Marshall, 144-19 38th Ave., Flushing, N.Y. 11354

[73] Assignees: Bruce Marshall; Tina Marshall, both of Flushing, N.Y.

[ * ] Notice: The portion of the term of this patent subsequent to Jul. 3, 2001 has been disclaimed.

[21] Appl. No.: 623,986

[22] Filed: Jun. 25, 1984

Related U.S. Application Data

[63] Continuation-in-part of Ser. No. 371,853, Apr. 26, 1982, Pat. No. 4,457,261.

[51] Int. Cl.<sup>4</sup> ............................................. A43B 3/00
[52] U.S. Cl. ........................................... 119/1; 36/111
[58] Field of Search ............................ 119/1; 36/111

[56] References Cited

U.S. PATENT DOCUMENTS

| | | | |
|---|---|---|---|
| 2,064,566 | 12/1936 | Richman | 36/2.5 |
| 2,424,172 | 7/1947 | Huddleston | 36/2.5 |
| 2,443,831 | 6/1948 | Miller | 54/79 |
| 2,651,853 | 8/1953 | Lewis | 36/2.5 |
| 3,747,565 | 7/1973 | Kellam | 119/1 |
| 3,762,073 | 10/1973 | Cantales | 36/2.5 P |
| 4,457,261 | 7/1984 | Marshall | 119/1 |

Primary Examiner—Hugh R. Chamblee
Attorney, Agent, or Firm—Ladas & Parry

[57] ABSTRACT

A mitten for canines which comprises a tube tapered-off at least near a closed bottom and having attached around an open top fastening means adapted to decrease the diameter of the open top for securing said top to the canine, said tube being made of a light-weight, waterproof, flexible latex material having a soft inside surface and an anti-slip outside surface provided both at the bottom of the mitten and substantially around the periphery of at least the lower part of the outside surface adjacent to the bottom.

18 Claims, 8 Drawing Figures

MITTENS FOR CANINES

This is a continuation-in-part of application Ser. No. 371,853, filed Apr. 26, 1982, now U.S. Pat. No. 4,457,261.

BRIEF SUMMARY OF THE INVENTION

This invention relates to protective wear for the paws of canines to protect them from cold weather, ice, snow, and slush, and salt spread on the streets and sidewalks to thaw snow and ice.

During the winter, dogs and other canines suffer from the weather in the form of cold, ice, snow, and slush, and from salt spread in the streets and on the sidewalks. The salt is a particular problem since it burns and irritates the paws and causes irritation of the stomach when licked off by the dog.

On the market are dog boots made of a plastic waterproof material. The disadvantage of these boots is that they are not designed to fit on the paws, and instead resemble children's boots having a flat bottom. The material used is too stiff and as a result the boots are uncomfortable and non-conforming to the paws. They hinder the natural walk of the animal. The boots are fastened by way of a rubber band on a button which is led around the paw and fastened on said button or by a snap button. In practice, the boots do not stay on for any considerable length of time.

Cantales U.S. Pat. No. 3,762,073 granted Oct. 2, 1973 uses flexible material for the manufacture of canines' boots. A particular shape of the boots to conform to the dog's legs is required so excluding the use of very flexible material and a non-slid sole is adhesively secured or heat sealed to the surface of the plastic flexible material. The boots are secured to the dog's leg by adjustable securing means which may be adhesive tabs.

According to the present invention there is provided a mitten for canines which comprises a tube tapered-off at least near a closed bottom and having attached around an open top fastening means adapted to decrease the diameter of the open top for securing said top to the canine, said tube being made of a light-weight, waterproof, flexible latex material having a soft inside surface and an anti-slip outside surface provided both at the bottom of the mitten and substantially around the periphery of at least the lower part of the outside surface adjacent to the bottom.

The present mittens during use stay on the paws of the animal without being uncomfortably tight on the legs so allowing for a natural walk and free blood circulation. The dog feels comfortable and unhindered in its movements as though the mittens were a natural part of its paws.

BRIEF DESCRIPTION OF THE DRAWINGS

In the accompanying drawings.

FIG. 1 shows the mitten in closed form while secured to the dog's paw or leg.

FIG. 2 shows the mitten in open form.

FIG. 3 illustrates an elongated mitten.

FIG. 4 illustrates a mitten having a bead at the edge of the open end.

FIG. 5 shows a mitten having a cut-out or elongated opening adjacent to the edge of the open end.

FIG. 6 shows a mitten having an elongated opening adjacent to the edge of the open end and having a means for closing the elongated opening.

FIG. 7 illustrates a mitten having an elongated opening adjacent to the edge of the open end, the opening being sealed by a flap.

FIG. 8 illustrates an elongated mitten having an elongated opening and a means for closing the opening, similar to that of FIG. 6.

DETAILED DESCRIPTION

The material from which the mittens according to this invention are made is a light-weight, flexible latex material having a non-slip grip on the portions of outside 4 and a velvet-soft inside 5. This material is commercially available from Gomaytex, S.A., Hernani, Spain. Not any material is useful and the success of the present invention is a result at least of the fact that the latex material used is sufficiently flexible to bend and ply with the paws' movements. The material is generally less than 0.5 mm (0.02 inch) thick. Preferably it is 0.15 to 0.17 mm (0.006 to 0.0065 inch) thick. Nevertheless, this material is strong enough to withstand the wear and tear of walking in the winter streets. The anti-slip outside prevents the dog from slipping on ice or snow. It is to be understood that at least the part under the bottom of the paw must be anti-slip, and portions adjacent to the part under the bottom of the paw or the entire outside of the mitten may have the anti-slip surface. Preferably, the anti-slip surface is provided both at the bottom 1 of the mitten and substantially around the periphery of at least the lower part of the outside surface 4 adjacent to the bottom 1.

The mittens may be made from the latex material by cutting a rectangular piece with the width of which is about the same as the width of the dog's paws (one paw of a dog may be wider than another) when the dog is standing. The piece is folded in about the middle of the long side of the rectangular, such that the non-slip grip is on the outside at the bottom 1 of the mitten under the paw and the sides are folded in slightly so as to cause a tapering off at least at the bottom so as to avoid rectangular corners as illustrated in the figures. The sides are attached to each other, for instance by stitching them together. The periphery of the open top after the sides are attached to each other is about the same length as the periphery of the dog's paw when the dog is standing. There is no stitching at the bottom so that the dog does not have to feel any seam under its paws.

Alternatively, the mitten may be made from a seamless latex tube of the shape described above.

Figure 2:
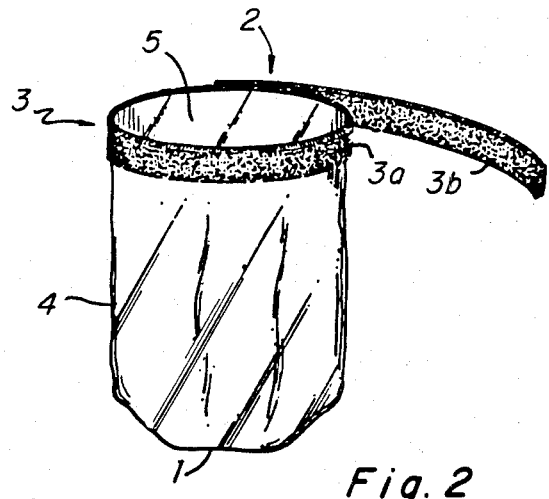

The invention uses fastening means which may be a self-gripping material 3 as shown in FIG. 2, and in the other figures, fastened at or near the open top 2 of the mitten to secure the mitten to the dog's paws or legs. This material does not cut off blood circulation and can be closed and opened in one easy movement.

A preferred material is available commercially e.g. under the name Velcro (registered Trade Mark). The Velcro material comprises a first strip or piece of fabric having a surface with a plurality of small hook-like elements and a second strip or piece of fabric having a surface with a plurality of small loop-like elements. Upon contacting said surfaces the two strips or pieces strongly grip each other. This material avoids the need for buttons, elastic bands or drawstrings and was found to be sufficiently gripping to prevent slipping off during use. No or a negligible amount of water was found seeping in from the top when the dog walked through deep puddles. The material is available in long strips. However, other fastening means in the form e.g. of elastic bands, buttons, straps, snaps or buckles may be employed.

Figure 1:
FIGS. 1 to 8 are perspective views of embodiments of a mitten for canines according to this invention.

It is preferred that a first Velcro strip is attached to the top of the mitten, by any means e.g. by stitching or use of adhesive around or near the edge of the open top. The first strip 3a attached to the periphery of the top has a surface which grips a surface of a second Velcro strip 3b which is attached at one of its ends to the open top of the mitten on the outside surface of strip 3a, the remaining length of strip 3b being unattached. One of strips 3a and 3b has a surface bearing hook-like elements and the other has a surface with loop-like elements, so that the surfaces grip each other tightly upon being pressed together, but are easily separated. The loose portion of strip 3b is used to fasten the top to the dog's leg by pulling the loose end of strip 3b around the leg and pressing it onto the peripherally attached strip 3a in a gripping movement whereby the strips grip each other without slipping as shown in FIG. 1.

The mittens can be easily cleaned after use and dried. They take little space and can be brought along and put on the dog when necessary during an outdoors walk.

The point of fastening on the dog's front leg is generally just up to and under the carpus which is just behind the back of the ankle. The rear leg has no carpus, but the point of fastening is generally at the same height as for the front leg. The mittens can of course be made in different sizes of width and length and the purchaser will select the correct size according to the width of the dog's paws and the height of the carpus.

Figure 3:
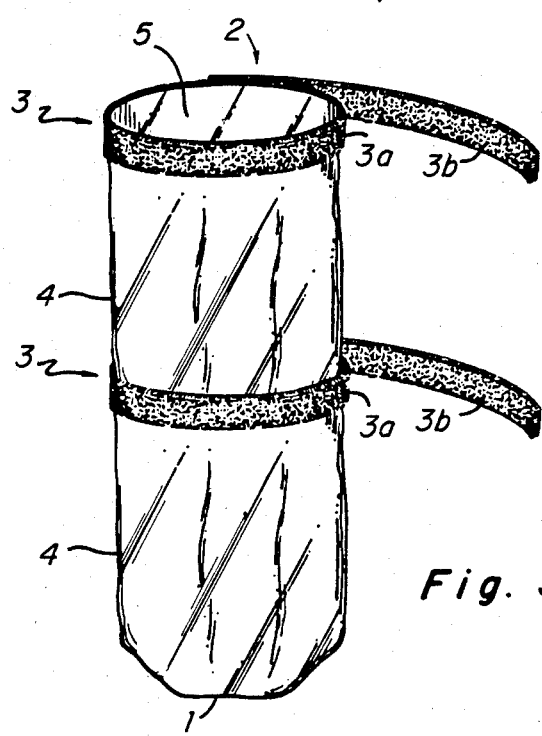

A mitten having an elongated length longer than that of FIG. 2 is shown in FIG. 3. In such a longer length mitten it may be advantageous, depending upon the length of the dog's leg, to provide a second self-gripping material 3 between the bottom 1 and top 2 of the mitten. An elongated mitten may be used to advantage in a size longer than necessary to reach the carpus, and extending above the carpus, especially when the mitten is to be used for veterinary purposes. Such purposes include protection for treated or bandaged areas on the dog's leg. The second self-gripping material 3 may be fixed at a particular location or can be provided at adjustable locations by removable attachment of strip 3a by means of snaps (not shown) or the like.

Figure 4:
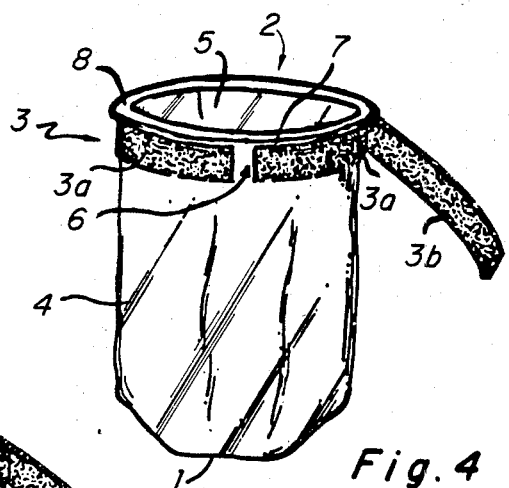

In an embodiment of the invention shown in FIG. 4, strip 3a is not attached completely around the periphery of the top of the mitten, but a gap 6 is provided. More than one gap may be provided. Strip 3a is attached near the edge of open top 2, there being a space 7 of surface 4 between strip 3a and the edge of open top 2. The edge of open top 2 is formed as a bead 8 or otherwise is flared or enlarged in diameter. The provision of beaded edge 8, space 7 and gap 6 enables the top of the mitten to be readily gripped and enlarged by outward pulling movement, to more easily place the mitten over the dog's paw when putting it on the dog.

Figure 5:
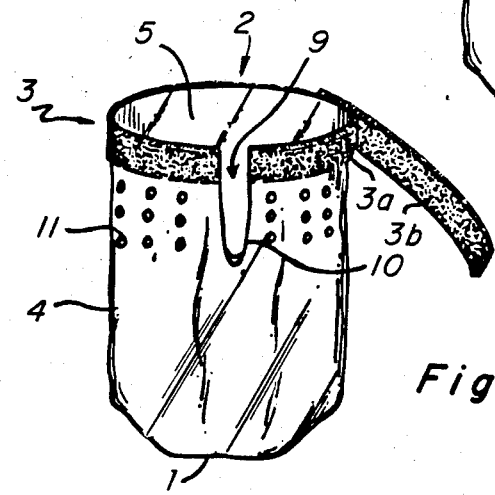

Such ease of putting the mittens on the dogs leg may also be achieved by providing a gap not only in strip 3a but in the top portion of the latex of the mitten, as shown in FIG. 5. A gap 9 is formed or cut at the top edge of the mitten and extends lengthwise beyond the point of attachment of strip 3a. Gap 9 is defined by an elongated cut-out edge 10, which may be U-shaped. Strip 3a is attached around the periphery of the top of the mitten up to edge 10 but not covering gap 9. If desired, ventilation holes 11 may also be provided through surface 4. The provision of gap 9 and ventilation holes 11 will afford the desired protection against most salt, cold, ice and snow problems. In more severe conditions or where considerable water will be found, the embodiments of the invention omitting the holes or gap would be more useful.

Figure 6:
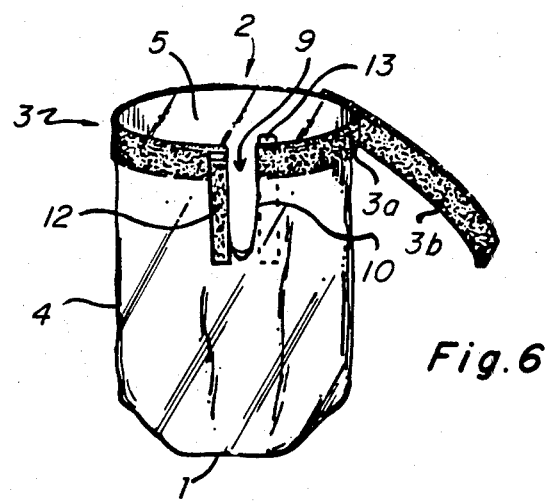

Under such more severe climate conditions a gap 9 may still be provided where provision is made for closing the gap as shown in FIG. 6. A means for closing gap 9 is provided by attaching a self-gripping strip 12 along one edge 10 of gap 9 on the outside surface 4. A second self-gripping strip 13 is attached along the opposite edge 10 of gap 9 on the inside surface 5. The self-gripping strips may be made of Velcro, one of the strips having a surface with hook-like elements and the other strip having a surface with loop-like elements. After putting the mitten on the dog's leg, gap 9 is substantially closed by pulling strip 13 on edge 10 outwardly and over strip 12 on the opposite of gap 9. The superimposed strips are pressed together and grip each other tightly. Alternative means of attaching opposite sides of gap 9 together may be used, such as snaps, zippers, buttons, buckles, hook and eye fasteners, etc.

Figure 7:
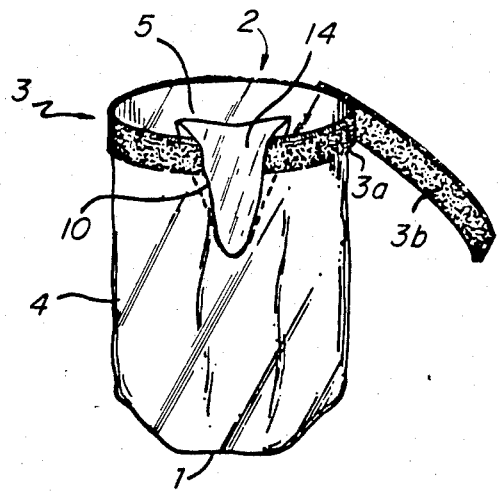

Another way of providing for enlargement of the top diameter of the mitten is shown in FIG. 7. The mitten shown in FIG. 7 includes a gap at the top portion of surface 4, defined by U-shaped edge 10. A flap 14 having a middle portion and two side portions is disposed inwardly, adjacent to the gap. The edges of the side portions of flap 14 are connected to edge 10 of the gap by forming them integrally with surface 4 or by attaching the side portions by stitching or adhesive, in such a way that flap 14 is sealed to edge 10, with surface 4 of the mitten and flap 14 forming an unbroken, continuous surface. Self-gripping strip 3a is attached around the top of the mitten up to edge 10 on opposite sides of the gap. During use, the top of the mitten can be enlarged in diameter by spreading the middle and side portions of flap 14, and the mitten is easily put onto the dog's leg. Upon pulling strip 3b around the top of the mitten, the top can be secured to the leg, and the sealed flap prevents entry of water.

Figure 8:
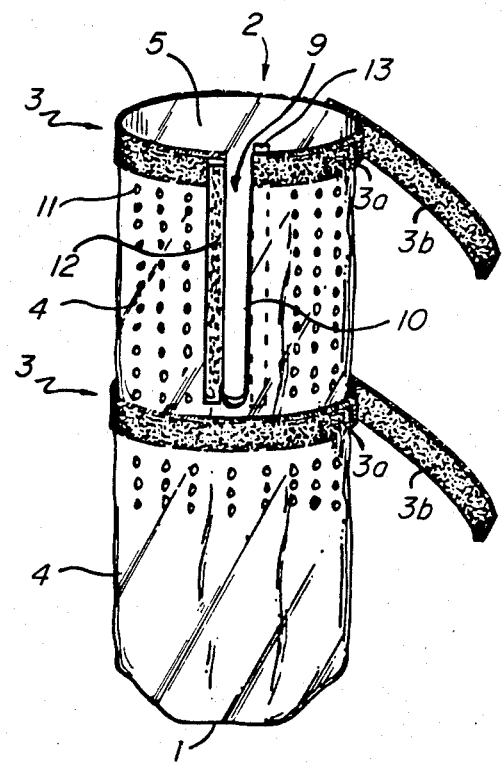

FIG. 8 shows an elongated mitten having a length designed to extend above the carpus, and having a second self-gripping material 3, if desired, as described in connection with the embodiment of FIG. 3. The mitten illustrated by FIG. 8 is particularly adapted for veterinary use involving protection of treated or bandaged portions of the dog's leg where it is important to provide ease of putting the mitten onto the leg and where necessary, effective ventilation to enable a long duration of use, or to promote healing of sores and the like. For this purpose, a gap 9 and/or holes 11 as described in connection with FIG. 6 may be provided, and gap 9 may have provision for closing in the form of self-gripping strips 12 and 13 as described above. Gap 9 may be considerably elongated and instead of closing with self-gripping strips, may be provided with alternative fastening means such as snaps, buttons, zippers, buckles, hook and eye fasteners, etc. A flap such as described in relation to FIG. 7 may be substituted for gap 9. The extent, size and position of holes 11 may be varied, or they can be omitted.

I claim:
1. A mitten for canines which comprises a tube tapered-off at least near a closed bottom and having attached around an open top fastening means adapted to decrease the diameter of the open top for securing said top to the canine, said tube being made of a lightweight, waterproof, flexible latex material having a soft inside surface and an anti-slip outside surface provided both at the bottom of the mitten and substantially around the periphery of at least the lower part of the outside surface adjacent to the bottom.

2. A mitten according to claim 1, wherein said latex material has a thickness of less than 0.5 mm (0.02 inch).

3. A mitten according to claim 1, wherein said fastening means comprises strips of self-gripping material.

4. A mitten according to claim 3, wherein said self-gripping material comprises a first strip of material attached to the periphery of the top of the mitten near or at the top, and a second strip of material attached only at one of its ends to the top of the mitten, a surface of the unattached portion of the second strip being positioned to be brought into contact with the outer surface of the first strip, one of said surfaces having a plurality of small hook-like elements and the other of said surfaces having a plurality of small loop-like elements, said surfaces thereby being adapted to grip each other tightly and releasably upon contact.

5. A mitten according to claim 4, wherein said first strip of self-gripping material is shorter than the periphery of the top of the mitten, so that when attached to the top, a gap remains between the ends of said first strip, said first strip is spaced from the edge of the top of the mitten, and the edge of the top of the mitten is in the form of a bead or flange.

6. A mitten according to claim 1, wherein the top portion of said tube comprises a gap extending to the edge of the top of the mitten, said fastening means being positioned on each side of said gap.

7. A mitten according to claim 6, wherein said gap is closeable by additional fastening means comprising a first strip of self-gripping material attached to the outside of said tube adjacent to one edge of a side of said gap and a second strip of self-gripping material attached to the inside of said tube adjacent to an edge of the opposite side of said gap.

8. A mitten according to claim 6, further comprising holes in said tube for ventilation, said holes being in the upper portion of said tube.

9. A mitten according to claim 6, further comprising a flap disposed inwardly in said tube, said flap comprising a middle portion and two side portions, the edges of said side portions being connected to the edges of said gap such that the flap forms an unbroken surface with said tube.

10. A mitten according to claim 1, wherein said tube is elongated to a length extending above the carpus of a dog's leg, and a second fastening means adapted to decrease the diameter of the tube is provided and is positionable at a location between the first fastening means and the bottom of the mitten.

11. A mitten according to claim 10, wherein said second fastening means is located at a position adapted to be just up to and under the carpus of a dog's leg.

12. A mitten according to claim 10, wherein said second fastening means comprises strips of self gripping material.

13. A mitten according to claim 10, wherein the top portion of said tube comprises a gap extending to the edge of the top of the mitten, said fastening means being positioned on each side of said gap.

14. A mitten according to claim 13, wherein said gap is closeable by additional fastening means comprising a first strip of self-gripping material attached to the outside of said tube adjacent to one edge of a side of said gap and a second strip of self-gripping material attached to the inside of said tube adjacent to an edge of the opposite side of said gap.

15. A mitten according to claim 13, further comprising holes in said tube for ventilation, said holes being in the upper portion of said tube.

16. A mitten according to claim 13, further comprising a flap disposed inwardly in said tube, said flap comprising a middle portion and two side portions, the edges of said side portions being connected to the edges of said gap such that the flap forms an unbroken surface with said tube.

17. A mitten according to claim 1, wherein said tube has a length such that said fastening means can secure the tube on a dog's leg at a point just up to and under the carpus of the dog's leg.

18. A mitten according to claim 1, wherein substantially the entire outside of said mitten has said anti-slip surface.

* * * * *